Nov. 12, 1963  C. F. BALL  3,110,482
TWIN-BORE MINER
Filed Jan. 5, 1955  10 Sheets-Sheet 1

FIG. 1a.

INVENTOR:
CHARLES F. BALL
BY Charles F. Osgood,
ATTORNEY

FIG. 1b.

INVENTOR:
CHARLES F. BALL

FIG. 2a.

Nov. 12, 1963  C. F. BALL  3,110,482
TWIN-BORE MINER
Filed Jan. 5, 1955  10 Sheets-Sheet 5

INVENTOR:
CHARLES F. BALL
BY Charles F. Osgood,
ATTORNEY

Nov. 12, 1963

C. F. BALL 3,110,482

TWIN-BORE MINER

Filed Jan. 5, 1955

INVENTOR:
CHARLES F. BALL

BY *Charles F. Osgood,*

ATTORNEY

Nov. 12, 1963　　　　　　　C. F. BALL　　　　　　3,110,482
TWIN-BORE MINER
Filed Jan. 5, 1955　　　　　　　　　　　　10 Sheets-Sheet 9

FIG. 13.

INVENTOR:
CHARLES F. BALL
BY Charles F. Osgood,
ATTORNEY

Nov. 12, 1963  C. F. BALL  3,110,482
TWIN-BORE MINER
Filed Jan. 5, 1955  10 Sheets-Sheet 10

INVENTOR:
CHARLES F. BALL
BY Charles F. Osgood
ATTORNEY though vented the United States Patent Office 3,110,482
Patented Nov. 12, 1963

3,110,482
TWIN-BORE MINER
Charles F. Ball, Franklin, Pa., assignor to Joy Manufacturing Company, Pittsburgh, Pa., a corporation of Pennsylvania
Filed Jan. 5, 1955, Ser. No. 479,933
18 Claims. (Cl. 262—9)

This invention relates to mining apparatus and more particularly to a continuous mining apparatus known as a continuous miner for dislodging and disintegrating the mineral of a solid mine vein and for loading out the disintegrated mineral.

In a continuous mining apparatus of the type known as a twin-bore miner, a pair of oppositely rotating cutting and disintegrating or boring heads cut out parallel overlapping or intersecting bores in the mineral of a solid mine vein, leaving points of mineral of substantially triangular or V-shape at the floor and roof and usually these triangular portions of mineral which partially separate the bores are cut off or trimmed by floor and roof trimming cutters thereby to form a mine entry or passageway of generally ovate shape in cross section. Usually the revolving boring heads of this character embody series of concentric boring elements or cutters for forming a central pilot hole and encircling concentric annular kerfs which form concentric annular projections or ringlike cores of mineral as the boring heads are advanced and these projections or cores are periodically broken off by suitable core breakers on the revolving heads. The dislodged and disintegrated mineral is directed inwardly and rearwardly toward conveying means within the apparatus and the disintegrated mineral is conveyed by such conveying means rearwardly of the apparatus to a convenient point of delivery remote from the working face. The apparatus is slowly advanced toward the face as mining progresses by a mobile base such as a tractor base, provided with endless crawler treads. The treads of the tractor base are also employed in the tramming of the apparatus about the mine and in the steering of the apparatus. To permit retraction of the head structure within the mine entry or passageway, the boring arms of the boring heads and the trimming cutters may be retractable thereby to collapse the head structure to reduce its outer limits.

The present invention contemplates improvements over known types of continuous miners in that the adjustable boring heads and trimming cutters are improved and the upper cutter is vertically adjustable and cooperates with the boring heads to not only trim the roof but also to vary the height of the cut. The boring heads and trimming cutters are retractable to enable collapse of the head structure thereby to facilitate retraction of the miner in the entry or mine passageway. Also, improved tiltable mounting means is provided for the cutting and boring head structure on the base whereby tilting and leveling of the boring heads is made possible in a novel manner.

It is, therefore, an object of the present invention to provide continuous mining apparatus of the type known as a twin-bore miner whereby the mineral of a solid mine vein may be dislodged and disintegrated in an improved manner. Another object is to provide an improved twin-bore miner having oppositely rotating boring heads for forming parallel overlapping or intersecting bores in a mine vein and having improved lower and upper trimming cutters associated therewith for cutting off the V-shaped or triangular points which partially separate the overlapping or intersecting bores at the floor and roof thereby to provide a mine entry or passageway of generally ovate shape in cross section. Yet another object is to provide an improved twin-bore miner having improved tiltable mounting means for the boring head mechanism thereby to enable tilting and leveling up of the boring heads. A further object is to provide an improved continuous miner having revolving boring heads for forming parallel overlapping or intersecting bores in a solid mine vein and having an improved adjustable top cutter associated therewith. A still further object is to provide an improved continuous miner having a novel arrangement of the rotary boring heads and upper and lower trimming cutters and having improved mounting means for the upper cutter whereby the latter may be lowered in a vertically overlapping relation with and rearwardly of the lower trimming cutter in an extremely compact manner. Still another object is to provide an improved collapsible boring head structure for a continuous miner whereby the latter may be readily retracted in the mine entry or passageway formed thereby. A further object is to provide an improved twin-bore miner having retractable boring arms on the boring heads and collapsible upper and lower cutters whereby the boring head structure of the miner may be readily collapsed or contracted. Yet another object is to provide improved driving means for the upper and lower trimming cutters and for the boring heads. These and other objects and advantages of the invention will, however, hereinafter more fully appear in the course of the ensuing description and as more particularly pointed out in the appended claims.

In the accompanying drawings there are shown for purposes of illustration one form and a modification which the invention may assume in practice.

In these drawings:

FIG. 5 is a longitudinal vertical section taken on the planes of line 5—5 of FIG. 1a.

FIG. 6 is an enlarged detail vertical section taken on line 6—6 of FIG. 1a, showing an adjusting screw and nut device for the tiltable mounting for the upper trim cutter.

FIG. 19 is a detail view, partially in vertical section, showing a modified form of adjusting means for the take-up sprocket of the lower trim chain.

The improved continuous miner, as shown in the drawings, constitutes an improvement over that disclosed in my copending application Serial No. 246,776, filed September 15, 1951, now Patent No. 2,777,681, and generally comprises a mobile base 1 on which is tiltably supported a frame 2, and journaled on the forward portion of this tiltable frame are oppositely rotating boring heads 3 and 4, a lower trimming cutter generally designated 5 and an adjustable upper trimming cutter generally designated 6. Conveying means generally designated 7, extending longitudinally centrally of the tiltable frame 2, extends forwardly and downwardly to the rear of the lower portions of the boring heads, rearwardly of the lower trimming cutter, and this conveying means receives the mineral dislodged by the boring heads and by trimming cutters and conveys the disintegrated mineral received thereby rearwardly of the apparatus to a convenient point of delivery.

Figure 8:
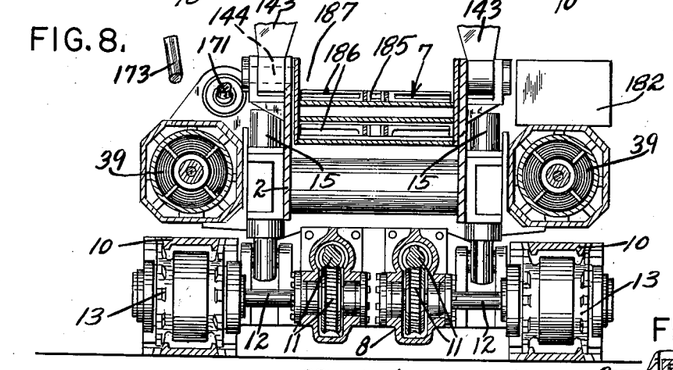
FIG. 8 is a cross section taken on line 8—8 of FIG. 5.

The mobile base 1 is herein desirably in the form of a tractor base and comprises a frame 8 supported by side frames 9 about which endless crawler treads 10 are guided for orbital circulation. The crawler treads may be driven and controlled to effect propulsion and steering of the apparatus in any well-known manner, and one form of tread driving and controlling means is disclosed in my copending application Serial No. 396,508, filed December 7, 1953, now Patent No. 2,771,958. As shown in FIG. 8, worm gearings 11 drive shafts 12 which are operatively connected to tread drive sprockets 13 through suitable planetary reduction gearing (not shown) enclosed within the sprockets and disposed within the orbits of the tread chains.

Figures 5, 6, 19:
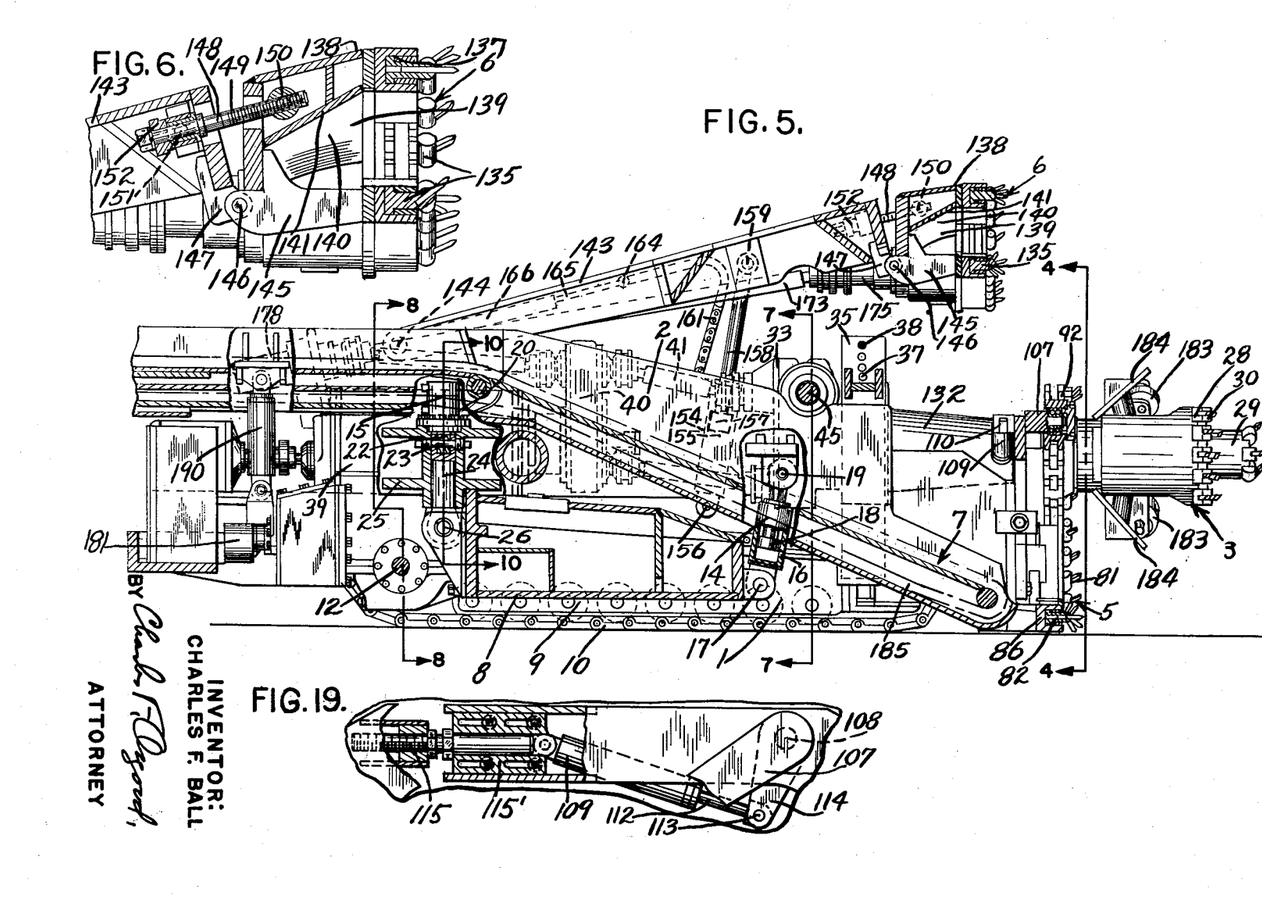
Figure 7:
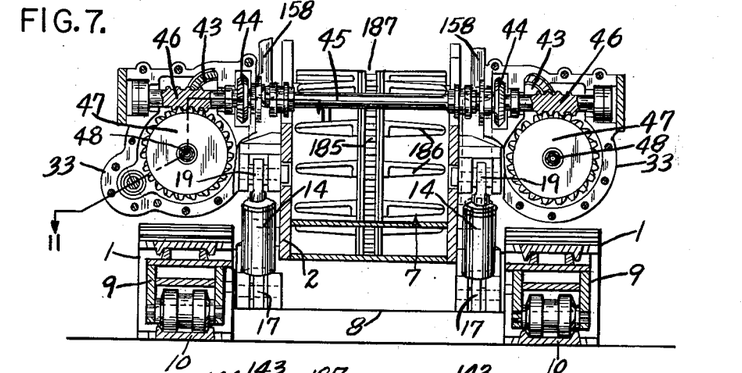
FIG. 7 is a cross section taken on line 7—7 of FIG. 5.
Figure 10:
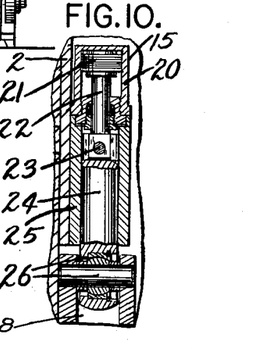
FIG. 10 is a detail vertical section taken on line 10—10 of FIG. 5, illustrating one of the head tilting cylinders.

The tiltable frame 2 is supported on the frame 8 of the tractor base by a pair of extensible front hydraulic jacks 14 (FIGS. 5 and 7) and a pair of extensible rear hydraulic jacks 15 (FIGS. 5 and 10). Conventional control valve means, as later mentioned, may regulate the supply of liquid under pressure from any suitable source concurrently to the front jacks to operate the latter in unison, and separately to the rear jacks to operate either of the latter independently of the other. Each front jack comprises an upright cylinder 16 pivotally mounted at its lower end, at 17, at the forward portion of the base frame and reciprocable in this cylinder is a piston 18 having an upwardly extending piston rod pivotally connected at 19 to the side of the frame 2. The rear jacks each comprise an upright upper cylinder 20 (FIG. 10) containing a reciprocable piston 21 having its piston rod 22 extending downwardly from the cylinder and pivotally connected at 23 to an upright guide rod 24, the latter being reciprocably guided within the bore of a guide member 25 secured to the tiltable frame and by which the jack cylinder 20 is carried. The upright guide rod is reciprocably mounted in its guideway and is universally pivotally mounted at its lower end at 26 at the side of the base frame. By simultaneously operating the front jacks 14, the frame 2 may be tilted endwise in vertical planes relative to the base about the rearwardly located transverse pivots of the pivotal mountings 26 for the rear jacks to raise or lower the boring heads, and by separately operating the rear jacks 15 the frame 2 may be tilted sidewise about its longitudinal axis relative to the base to level up the boring heads with respect to the mine floor. By trapping liquid in the jack cylinders, the frame 2 may be firmly locked in adjusted position.

Figure 3:
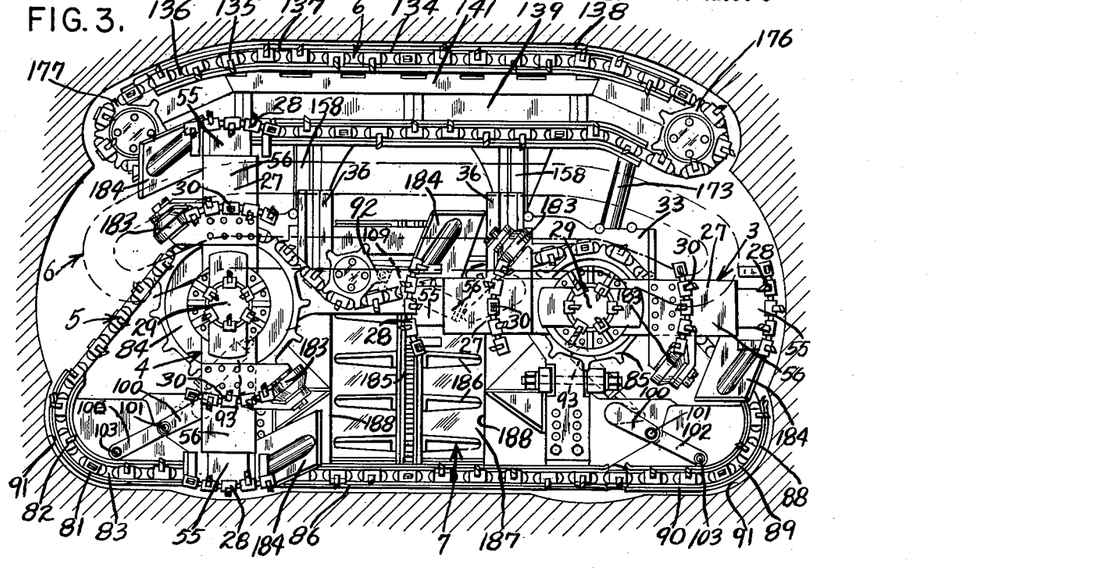
FIG. 3 is a front end elevational view of the miner shown in FIGS. 1a and 1b, with the miner shown in operating position in a mine entry or passageway formed thereby in a mine vein.
Figure 4:
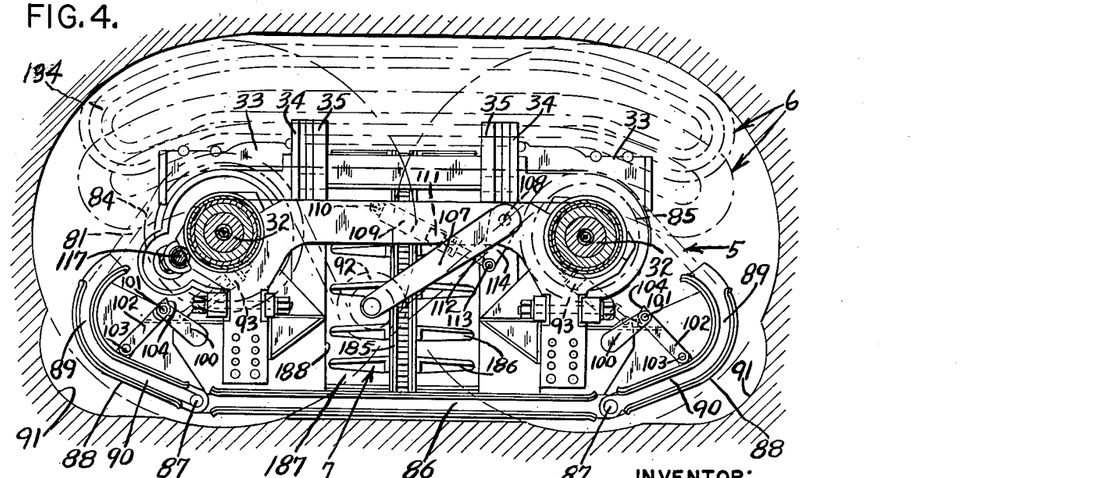
FIG. 4 is a sectional view taken on line 4—4 of FIG. 5, showing in broken lines the upper and lower trim cutters in collapsed position.
Figures 11, 12:
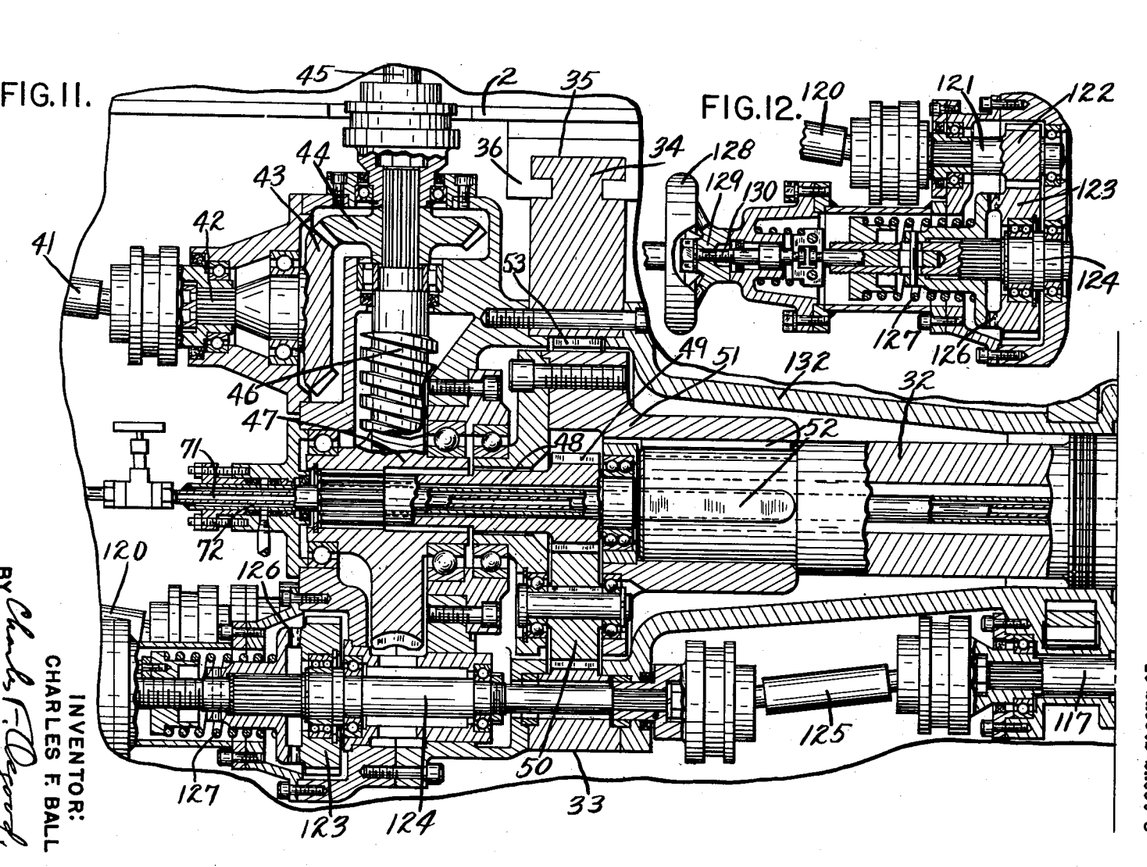
FIG. 11 is developed sectional view taken on the planes of line 11—11 of FIG. 7.
FIG. 12 is a detail vertical section showing the throwout clutch for the lower trimming cutter.
Figure 13:
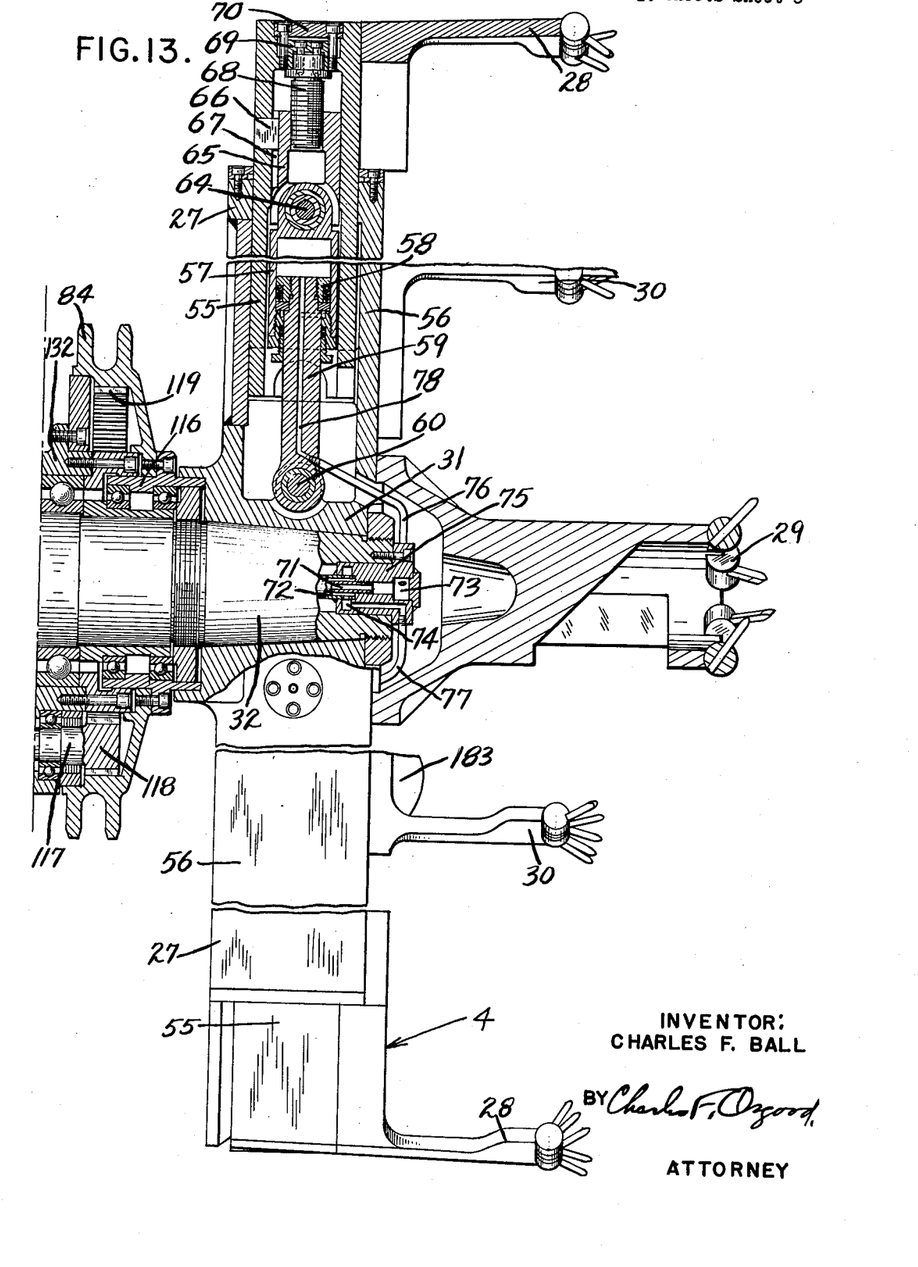
FIG. 13 is an enlarged vertical section taken through one of the revolving boring heads, showing the adjustable boring arms.

The rotary boring heads may assume various forms but are herein, for illustrative purposes, similar to that disclosed in my copending application Serial No. 446,888, filed July 30, 1954, now Patent No. 2,801,094, and comprise telescopic radial boring arms 27 carrying outer cutter supports or bit carriers 28, a central pilot cutter 29 and intermediate cutter supports or bit carriers 30. These radial boring arms are mounted on hubs 31 which are secured to parallel horizontal shafts 32 extending longitudinally of the apparatus (FIGS. 4, 11 and 13). Each shaft 32 is journaled in bearings suitably supported within a gear housing 33 carried by a vertical slide 34 which has upright guides at its sides slidingly guided in upright guideways 35 formed in guide members 36 mounted at the sides of the tiltable frame 2 (FIGS. 3, 5 and 11). Thus, when boring heads of different diameters are employed, the housings 33 in which the head shafts 32 are journaled may be adjusted vertically into different predetermined positions by movement of their slides along the guideways 35 of the guide members 36 so that the bottoms of the rotary heads may be disposed at the proper level with respect to the bottom trimming cutter. Any suitable means, such as bolts or screws 37 (FIG. 5), receivable in suitably spaced openings 38 in the parts, may be provided to locate the supporting slide for the boring heads in their different predetermined positions of vertical adjustment relative to the guideways of the frame 2. Of course, by operating the front jacks 14 the frame 2 may be tilted about the rearwardly located pivots of the rear jacks to raise and lower the boring heads with respect to the mine floor, but without the provision of the predetermined vertical adjustment of the boring heads relative to the tiltable frame the bottoms of the boring heads might not be properly located with respect to the lower or floor trimming cutter heretofore mentioned and hereinafter described in some detail.

The driving means for the boring heads comprises motors 39, desirably electric motors, mounted at the sides of the tiltable frame 2 and having their power shafts connected, through conventional clutch controlled speed reducing gearings (not shown) contained in gear casings 40 secured to the front ends of the motor casings, to universally pivoted telescopic drive shafts 41 (FIGS. 1a and 2a) which drive longitudinally extending shafts 42 (FIG. 11) suitably journaled within bearings supported within the gear housing 33. Secured to the shafts 42 are bevel gears 43 meshing with bevel gears 44 having their hubs keyed to a transverse horizontal shaft 45 likewise suitably journaled within bearings supported within the gear housing 33. Secured to the transverse shaft in axially spaced relation thereon (FIG. 7) are worms 46 meshing with worm wheels 47 axially aligned with the head-shafts 32 respectively, and also suitably journaled within bearings supported within the gear housing 33. Keyed to the hubs of and arranged coaxially with the worm wheels 47 are longitudinally extending shafts 48 having spur gears 49 formed thereon, and these spur gears 49 mesh with spur planet gears 50 (FIG. 11) mounted on a rotatable support or carrier 51, keyed at 52 to the rear ends of the head-shafts 32, and these planet gears in turn mesh with an internal gear 53 secured to the vertical slide 34 on which the gear housing 33 is mounted. Thus, the boring heads may be rotated in unison in relatively opposite directions through the worm gearings 46, 47 driven through the transverse shaft 45 by the motors 39. The right-hand motor drives the right-hand boring head and the left-hand motor drives the left-hand boring head, and the necessary balance of power is provided by the transverse shaft 45 which maintains the boring arms in proper timed relation with each other. Usually the loads on the boring heads are not equally divided and when one motor is taking the bigger load the other motor will supplement the more heavily loaded one.

Figure 14:
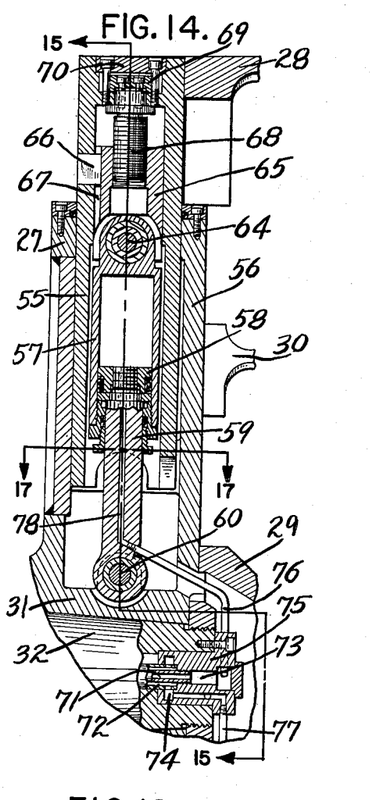
FIG. 14 is a vertical section taken through one of the radial boring arms of the head, with the outer cutter arm or cutter in full extended position.
Figure 15:
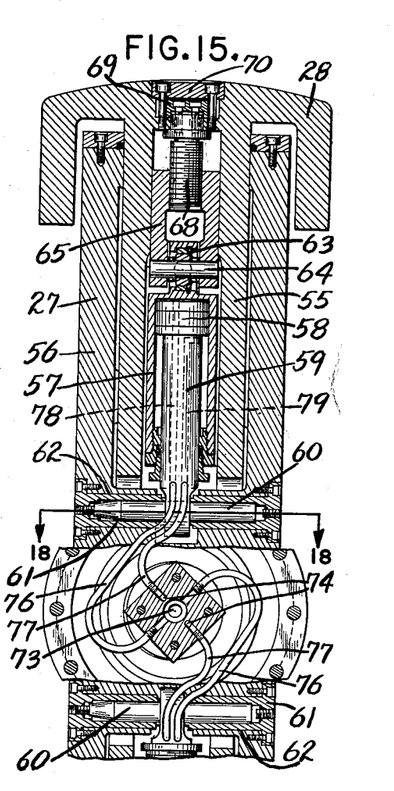
FIG. 15 is a vertical section taken on line 15—15 of of FIG. 14.
Figure 16:
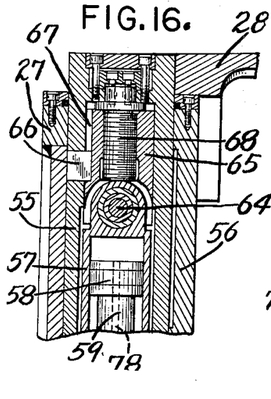
FIG. 16 is a section taken on the plane of FIG. 14, showing the outer cutter arm in retracted position.
Figure 17:
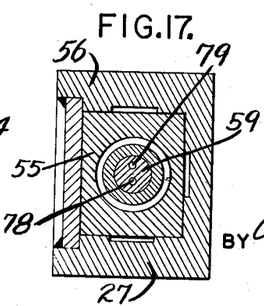
FIG. 17 is a detail horizontal section taken on line 17—17 of FIG. 14.
Figure 18:
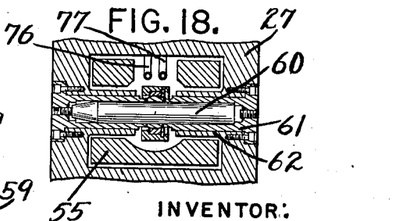
FIG. 18 is a detail horizontal section taken on line 18—18 of FIG. 15.

Referring to FIGS. 13 to 18 inclusive, it will be noted that the outer cutter supports or bit carriers 28 are carried by the telescopic arms which comprise radial slides 55 of rectangular cross section having telescopic engagement with the rectangular bores of hollow, rectangular outer radial arms 56 secured to the head-hubs, and the slides and arms have relative radial adjustment in a manner similar to that disclosed in the copending application Serial No. 446,888, above referred to. Arranged axially lengthwise within the hollow, telescopic radial arms of each head are reciprocable hydraulic cylinders 57 containing relatively stationary pistons 58 having their piston rods 59 pivotally engaging transverse pivot pins 60 mounted within the bores or flanged sleeves 61 arranged in alignment within transverse bores 62 in the outer arms 56 and detachably held in position, as by screws. The outer ends of the cylinders 51 have universal pivotal engagement at 63 with transverse pivot pins 64 mounted in adjustable blocks 65. These blocks are slidable lengthwise within the bores of the radial slides 55 and are held against rotation by keys 66 secured to the slides and engaged in keyways 67 extending lengthwise of the blocks at one side thereof. Adjusting screws 68 are threadedly engaged within the blocks 65 and are secured, as by screws, to end plates 69 held in place by outer detachable caps 70. When the caps 70 are removed the screws 68 may be rotated in a suitable manner as by a suitable turning instrument, such as a wrench, to effect mechanical adjustment of the outer bit carriers 28. Liquid under pressure from any suitable source may be conducted through concentric pipes 71 and 72 (FIGS. 11 and 14), coaxial with the head-shafts, to chambers 73 and 74 in flanged heads 75 secured, as by screws, to the forward ends of the headshafts 32 (FIG. 14). The flanged portion of each head 75 is of square shape (FIG. 15). Pairs of conduits 76 and 77 extending axially through the shafts 32 and 48 connect the chambers 73 and 74 with parallel passages 78 and 79 in the piston rods 59 so that hydraulic pressure may be supplied to the bores of the cylinders 57 at the opposite sides of the pistons 58. It will thus be seen that by properly supplying liquid under pressure to the cyliniders 57 the outer bit carriers 28 may be retracted to collapse the heads or may be extended to bring the outer arms back to their outermost positions of predetermined radial adjustment. Since the structures of the mechanical and hydraulic adjusting devices are generally similar to those of the copending application Serial No. 446,888, mentioned above, further description of the detail elements thereof is herein unnecessary.

Figure 1A:
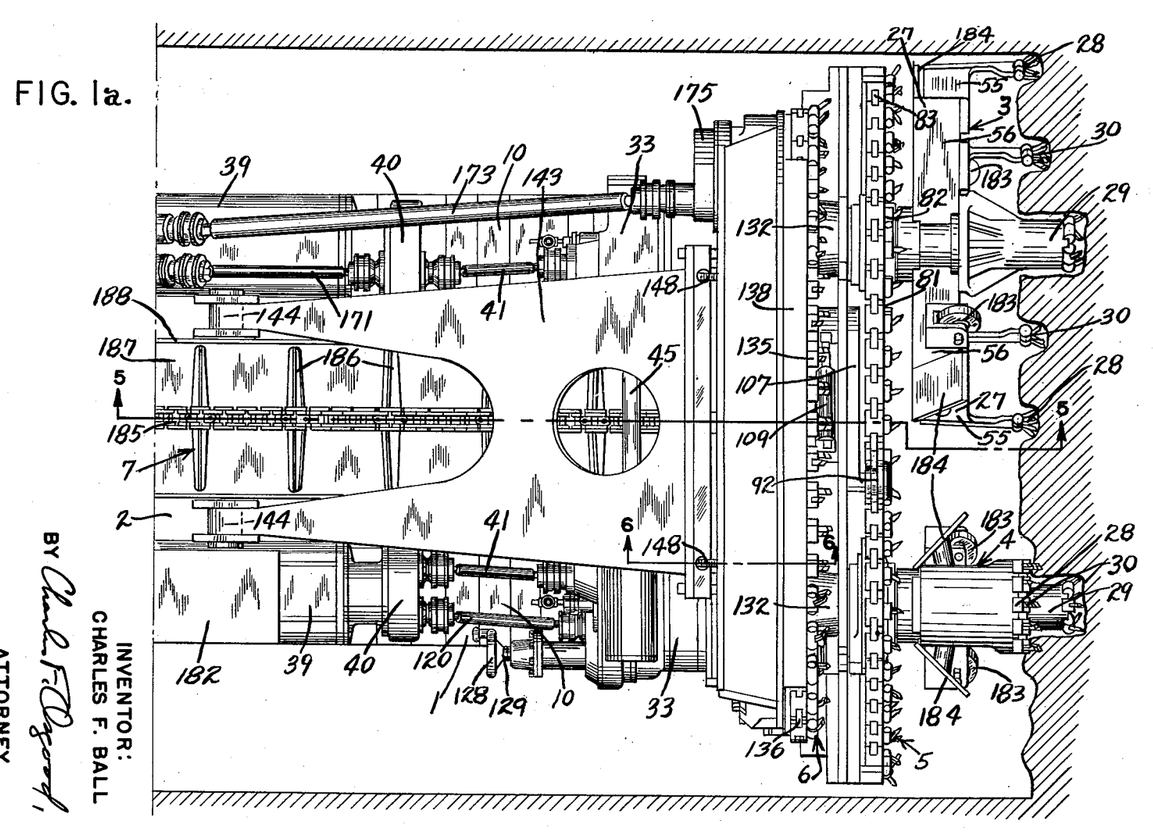
FIGS. 1a and 1b, taken together, constitute a plan view of a continuous miner constructed in accordance with a preferred illustrative embodiment of the invention.
Figure 2A:
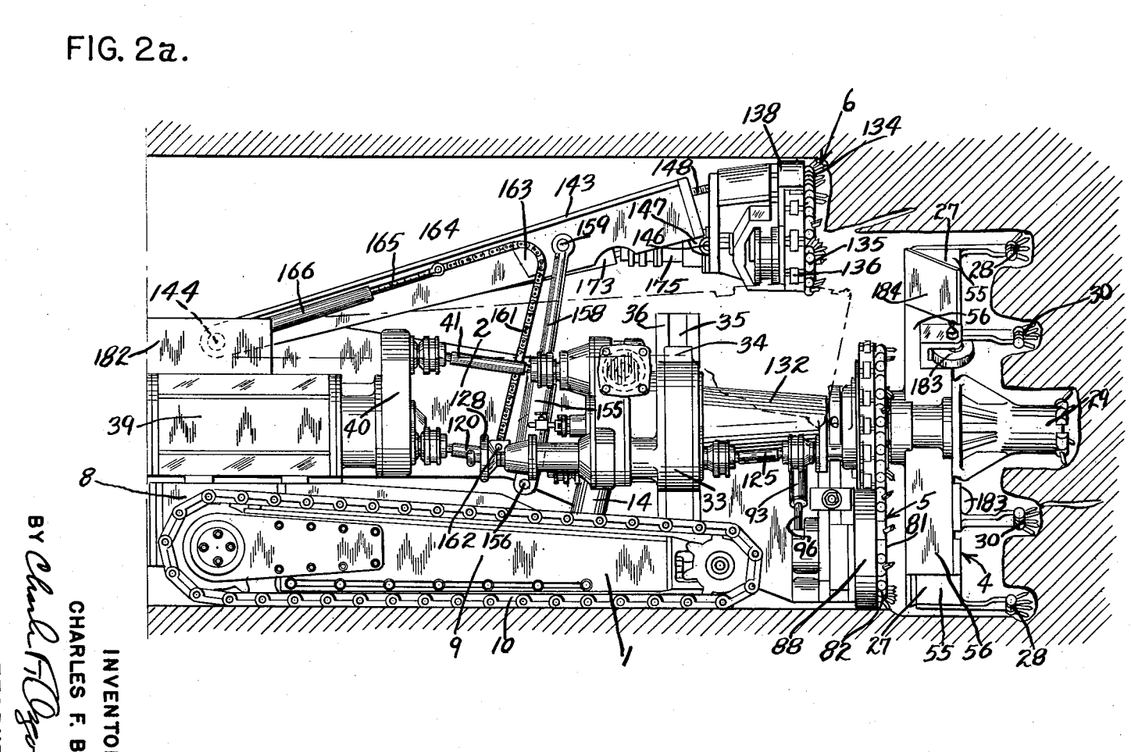
FIGS. 2a and 2b, taken together, constitute a side elevational view of the miner shown in FIGS. 1a and 1b.

The lower trimming cutter or floor cutter 5 is arranged in a transverse vertical zone between the rear sides of the rotary boring heads and the front side of the upper trimming cutter 6 when the latter is lowered, as shown in dotted lines in FIG. 2a (see also FIGS. 1a and 5). This trimming cutter comprises an endless loop type cutter chain 81 having chain blocks 82 pivotally connected by strap links 83. Projecting forwardly from the chain blocks are bit supporting lugs having sockets for receiving conventional detachable cutter bits. As shown in FIG. 3, this endless trimming chain extends in an open-centered loop about chain sprockets 84 and 85 respectively surrounding the axes of the boring head-shafts 32, and the lower active run of the chain extends transversely near the floor level along a horizontal guideway 86 carried at the forward lower portion of the tiltable frame 2 (see also FIG. 5). Pivotally mounted at 87 on parallel longitudinally extending axes at the sides of the forward lower portion of the frame 2 are side guides or guide frames 88 having curved guideway portions 89 and communicating straight guideway portions 90, the latter when the pivoted guides 88 are lowered (as shown in FIG. 3) being disposed in transverse alignment with the horizontal guideway 86. The endless chain 81 passes downwardly and laterally from the sprockets 84 and 85 at the sides of the apparatus about the curved guideway portions 89 and along the straight guideway portions 90 and the horizontal guideway 86, thereby to cut a level floor. The lower run of this trimming chain, as the apparatus is advanced over the floor, cuts off the lower substantially triangular or V-shape projection formed by the boring heads at the intersection of the bores, and also this trimming chain cuts side recesses, at 91, into the outer walls of the bores near the floor level, as shown.

Figure 9:
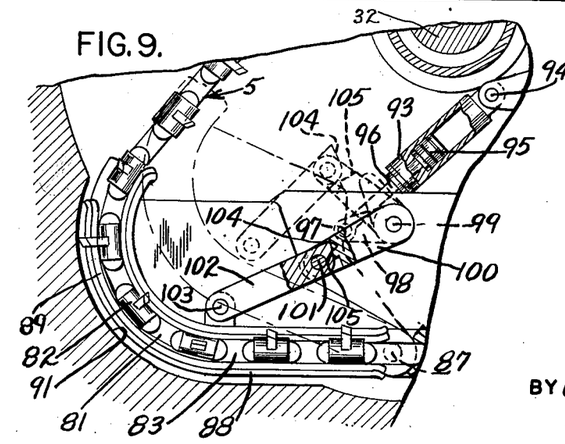
FIG. 9 is a detail view, illustrating one of the collapsible guides for the lower trim cutter.

A take-up idler or idler sprocket 92 engages the top run of the loop chain intermediate sprockets 84 and 85 (FIGS. 3, 4 and 5) for taking up any undue slack in the chain. Hydraulic cylinders 93 (FIGS. 2a, 3, 4 and 9) are pivotally mounted at 94 on lugs secured to the frame 2 and these cylinders contain reciprocable pistons 95 having piston rods 96 pivotally connected at 97 to lever arms 98 secured to parallel longitudinally extending rocker shafts 99 suitably journaled on the frame 2. Secured to these rocker shafts are lever arms 100 pivotally connected at 101 to links 102 which are, in turn, pivotally connected at 103 to the pivoted guide frames 88. The links 102 have abutment surfaces 104 (FIG. 9) engageable with abutment surfaces 105 on the lever arms 100 when the guide frames 88 are in lowered position (shown in full lines in FIG. 9) to limit downward movement of the guide frames. When liquid under pressure is properly supplied to the cylinders 93 the guide frames 88 may be swung in transverse vertical planes about their pivots 87 between the full and dotted line positions shown in FIG. 9, and liquid may be trapped in the cylinders 93 at the opposite sides of the pistons 95 to hold the guide frames in extended position. When the guide frames 88 are in the raised dotted line position shown in FIG. 9, the side portions of the trimming chain are retracted laterally to collapse the head structure, as later explained.

The lower trimming chain, when the guide frames 88 are swung upwardly, has slack introduced therein which is automatically taken up by the take-up sprocket 92. This sprocket is journaled at the outer end of a lever 107 secured to a shaft 108 journaled on the frame 2 and a hydraulic cylinder 109 is pivotally mounted at 110 on a manually adjustable slide on the frame 2 and contains a reciprocable piston 111. This piston has its piston rod 112 pivotally connected at 113 to a lever arm 114 also secured to the shaft 108. When liquid under pressure is supplied to the cylinders 93 it is concurrently supplied to the cylinder 109 so that when the guide frames are swung about their pivots, the lever 107 is simultaneously swung to move the sprocket 92 to take up the slack. The means for controlling the supply of liquid under pressure to the cylinders 93 and 109 may assume any well-known form. A separate manual screw and nut type adjusting means 115 (FIG. 19) for the slide 115' may serve to take up any excess slack in the chain. If desired, the cylinder 109 may be manually controlled independently of the cylinders 93.

The sprocket 85 is an idler sprocket and the sprocket 84 is power driven to effect drive of the lower trimming chain and, as shown in FIG. 13, the hub of the sprocket 84 is secured, as by screws, to a sleeve 116 journaled on bearings supported by the adjacent head-shaft 32. A drive shaft 117 suitably journaled on the forward portion of the gear housing 33 has a spur pinion 118 secured thereto and this pinion meshes with and drives an internal gear 119 formed on sprocket 84. The motor 39 drives through a conventional universal telescopic drive shaft 120 (FIGS. 1a, 2a and 12) suitably coupled to a horizontal longitudinally extending shaft 121, the latter suitably journaled in bearings supported within the gear housing 33. Secured to the shaft 121 is a small spur gear 122 meshing wtih a large spur gear 123 (see also FIG. 11) journaled on a bearing supported by a coaxial, longitudinally extending shaft 124 in turn suitably journaled in bearings suitably supported within the gear housing. The forward end of the shaft 124 is suitably coupled to a conventional universal telescopic drive shaft 125 secured to the rear end of the drive shaft 117. A conventional clutch 126, desirably of the "chatter" type, is held in connected position by a coil spring 127 and the clutch may be released against the tension of the spring by a hand wheel 128 carrying a nut 129 threadedly engaging an adjusting screw 130. Thus, by turning the hand wheel the clutch may be connected or released at will. During retraction of the lower trimming chain, as above described, the clutch is manually disconnected to release the chain from its drive. This "chatter" clutch serves to limit the torque in the drive for the lower trimming chain.

It will be noted that the gear housing 33 has forwardly projecting tubular portions 132 which support forward bearings located in adjacency to the chain sprockets 84 and 85 (FIG. 13) and the head-shafts 32 are journaled in the rear bearings for the planet gear carriers 51 and these forwardly located bearings.

The upper trimming cutter or roof cutter 6 serves to cut off the upper substantially triangular or V-shaped projection formed at the intersection of the bores at the roof and may be elevated to vary the height of the mine entry or passageway. This upper trimming cutter may assume various forms, but herein, for illustrative purposes, comprises an endless loop cutter chain 134 having chain blocks 135 pivotally connected by strap links 136. Projecting forwardly from the blocks are cutter-supporting lugs having sockets for receiving conventional detachable cutter bits. The chain is guided for circulation in an orbit about the guideway 137 of an open-centered guide frame 138. The opening 139 through the center of this guide frame communicates with a rearwardly located chamber 140 and the mineral cut and dislodged by the upper loop cutter passes rearwardly through the opening 139 into the chamber 140 and is directed downwardly by an inclined upper plate 141. In the event a solid core of mineral is cut by the upper loop cutter the inclined surface of this upper plate serves to break down the core with a wedging action. The upper guide frame 138 is carried by an elongated boom frame 143 which is pivotally mounted at its rear end at 144 on the upper portion of the tiltable frame 2. This boom frame is of substantial width (FIG. 1a) and overlies the forward portion of the tiltable frame 2 in the manner shown in FIGS. 2a and 5. The guide frame 138 is supported by brackets 145 pivotally mounted at 146 on depending lugs 147 secured to the forward end of the boom frame 143 (FIGS. 5 and 6).

In order to position the loop cutter vertically in the different angular positions of the boom frame 143 about its pivot, adjusing devices 148 are provided. These adjusting devices may assume various forms but are herein, for illustrative purposes, shown as screw and nut devices. Each adjusting device comprises an adjusting screw 149 threadedly engaging a nut 150 pivotally mounted on a transverse axis on the guide frame 138 and this screw is pivotally connected at 151 to the forward portion of the boom frame 143 and has a suitable turning means 152. Thus, when the screws are rotated the guide frame may be tilted about its pivot 146 relative to the boom frame and the threads of the screws and nuts serve to lock the guide frame in adjusted position. Thus, the orbit of the loop cutter may be maintained in a transverse vertical plane in the different upper predetermined positions of the boom frame.

The boom frame may be swung in vertical planes about its pivot by means of extensible hydraulic jacks 154 comprising cylinders 155 pivotally mounted at 156 at the sides of the tiltable frame 2 and these cylinders contain reciprocable pistons 157 having upwardly extending piston rods 158 pivotally connected at their upper ends at 159 to the sides of the boom frame 143. Thus, when liquid under pressure is properly supplied to the jack cylinders the boom frame may be swung upwardly about its pivot to vary the elevation of the upper trimming cutter and by trapping liquid within the cylinders at the opposite sides of the pistons, the boom frame may be locked in adjusted position.

Upward adjustment of the upper trimming cutter is limited by limit chains 161 attached at their lower ends at 162 to brackets secured to the sides of the frame 2. These chains pass upwardly about curved guides 163 on the sides of the boom frame 143 and extend rearwardly to connection at their other ends, at 164, with stop rods 165. These rods extend into adjusting cylinders 166 carried by the sides of the boom frame and by the provision of the adjusting means for the rods the range of vertical adjustment of the upper cutter may be varied. If desired, suitable springs may be connected to the adjustable stop rods automatically to absorb any undue slackness in the chains 161 when the cutter is lowered.

Figure 1B:
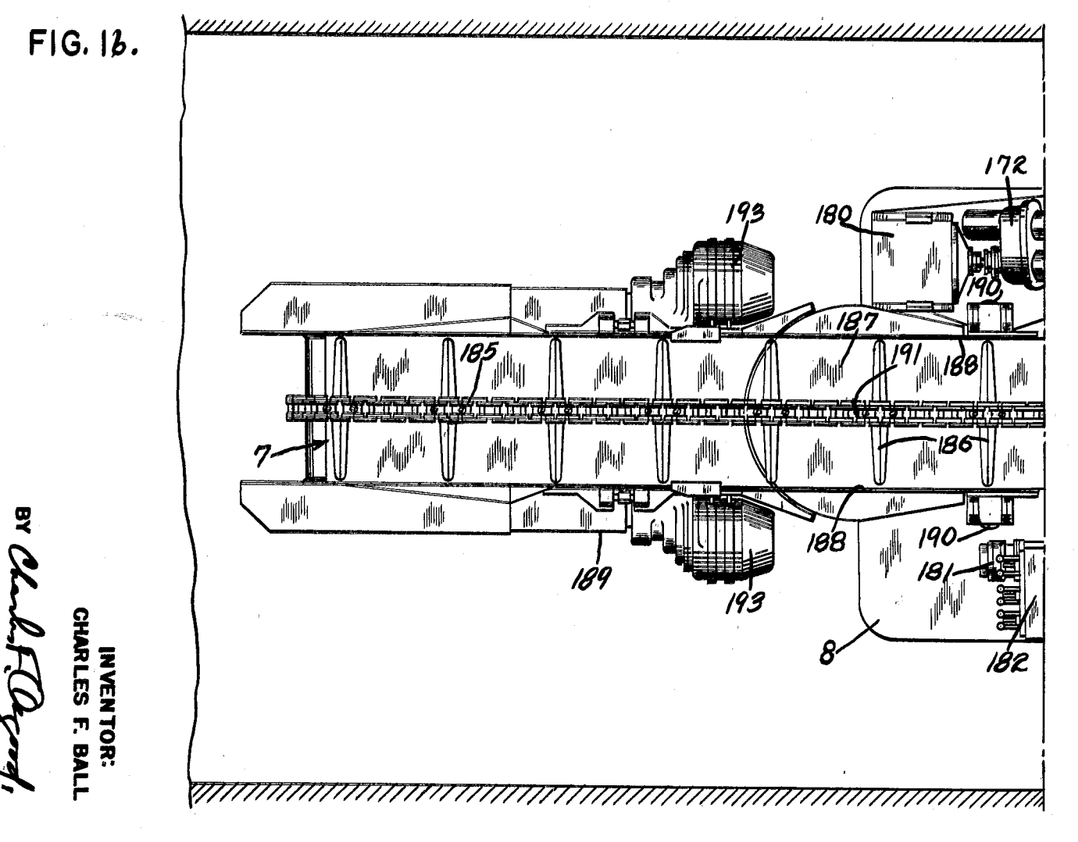

The driving means for the upper trimming chain is connected to one of the motors 39, and the motor drives through the speed reducer a conventional universal telescopic drive shaft 171 connected through gearing in a gear housing 172 (FIG. 1b) to a conventional universal telescopic drive shaft 173 suitably coupled to a longitudinal shaft journaled within the guide frame 138. Driven by this longitudinal shaft is a reduction gearing contained in a gear casing 175 and connected to a chain sprocket 176 (FIG. 3) which engages and drives the upper loop cutter chain 134. An idler sprocket 177 is arranged at the opposite side of the guide frame 138 and the upper loop cutter chain passes around this guide sprocket as it circulates about its guideways. The drive for the upper trimming chain, like that of the lower trimming chain, embodies a conventional "chatter" type torque limiting clutch similar to that shown in FIG. 12, but with the manual release omitted, as indicated in dotted lines at 178 in FIG. 5.

The conventional speed reducing gearings contained in the gear casings 40, as above described, embody manually releasable clutches which may be operated to disconnect the boring heads and the upper and lower trimming chains from the motors 39. During tramming of the machine about the mine these clutches are, of course, released.

As described above, the boring head structure is mounted on a vertical slide 34 which has its guides adjustable vertically along guideways 35 to vary the elevation of the head structure with respect to the tiltable frame 2, and the universal telescopic drive shafts 41 and 120 enable adjustment of the slide together with the gear housing 33 supported thereby without interrupting the drive for the heads and the lower trimming cutter. The universal telescopic drive shaft 173 enables vertical adjustment of the guide frame 138 for the upper trimming cutter 6 likewise while maintaining the drive.

Connected to one of the motors 39 is a conventional variable volume pump 180 which supplies liquid under pressure to the motors which drive the crawler treads of the tractor base, and a pump 181 is driven from the other motor 39 and supplies liquid under pressure to the other hydraulic devices of the machine. Mounted on top of the motor which drives the pump 181 is a conventional control valve mechanism 182.

Figure 2B:
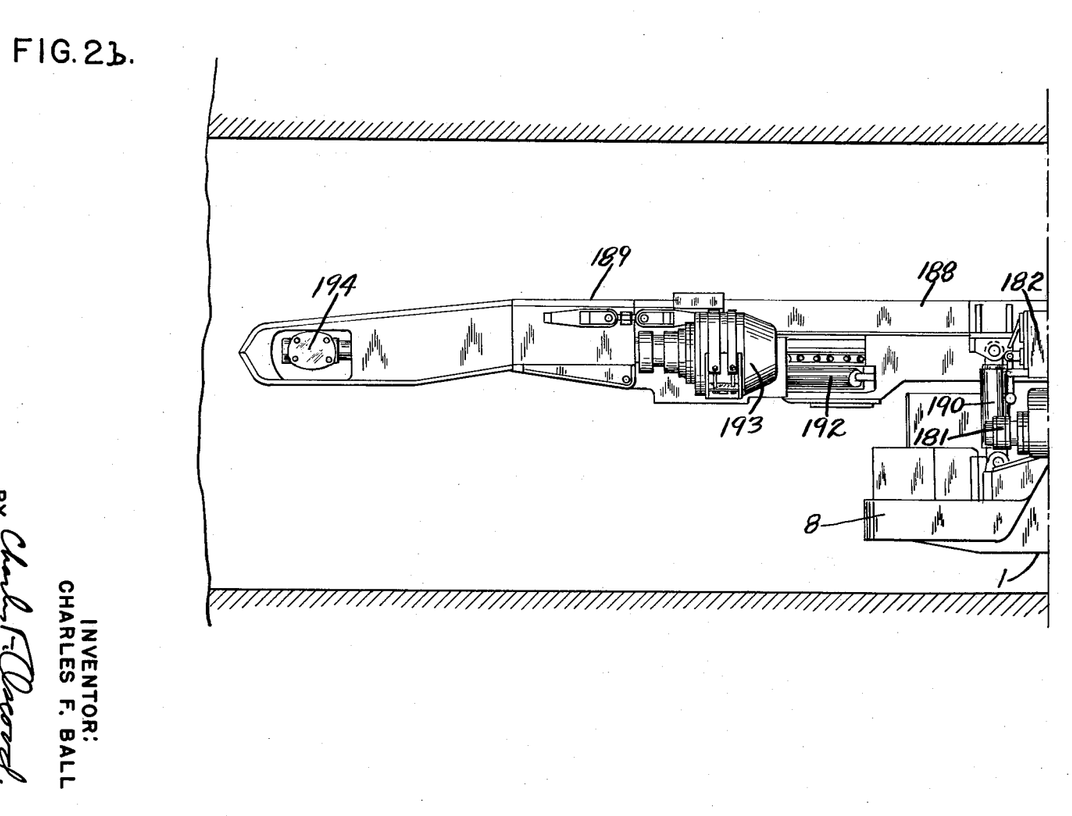

The rotary boring heads 3 and 4 have conventional core breakers in the form of wedging rollers 183 journaled on the radial boring arms and these rollers engage and break off the annular projections or ringlike cores of mineral formed by the bit carriers 28 and 30 as the boring heads revolve. Deflector plates 184 on the boring arms direct the dislodged and disintegrated mineral rearwardly and sweep the dislodged and disintegrated mineral inwardly at the bottoms of the heads toward the forward receiving portion of the conveying means 7. The conveying means likewise may assume various forms and is herein of a conventional design and comprises an endless conveyor chain 185 carrying spaced cross flights 186 which move along a troughlike passageway 187 provided by a conveyor frame 188. The rearward portion 189 of the conveyor frame is tiltable in vertical planes (FIGS. 1b and 2b) to vary the discharge height of the conveyor and hydraulic jacks 190 serve to tilt the rear conveyor portion and to hold it in adjusted position. The rearward discharge portion of the tiltable conveyor frame is laterally swingable about an upright pivot at 191 to vary the lateral position of the discharge end of the conveyor and hydraulic jacks 192 (FIG. 2b) are provided to effect such lateral swing. Motors 193 mounted at the sides of the rearward conveyor portion are connected through suitable reduction gearings (not shown) contained in gear casings 194 to the rearward end portion of the endless conveyor and these motors operate in unison to drive the conveyor.

The general mode of operation of the improved continuous miner above described is as follows: The miner may be trammed about the mine by the crawler treads 10 of the tractor base 1, and the treads may be operated to propel and steer the miner in a well-known manner. During tramming the boring heads 3 and 4 and the lower floor trimming cutter 5 may be held up above the floor level by the front hydraulic jacks 14 which tilt the frame 2 upwardly, and at that time the outer bit carriers of the heads may be held retracted by the hydraulic cylinders 57, the lower trimming chain may be held retracted by the hydraulic cylinders 93, and the upper roof trimming cutter 6 may assume its lowered retracted position. Since the tractor base has its separate hydraulic system and the drives between the motors 39 and the boring heads and trimming cutters embody releasable clutches, all the power devices of the contracted head end of the miner remain idle during the tramming operation and at that time the variable volume pump 180 driven by a motor 39 may supply liquid under pressure to the usual tread-driving motors under the control of the control valve mechanism 182. When the working face is reached with the boring heads located at the face of the mine vein, the hydraulic cylinders 93 and 109 may be operated to extend the guide frames 88 and properly tension the lower trimming chain, and the cylinders 57 may be operated to extend the boring arms to their extreme diameter, with the bottoms of the circular paths traced by the outer cutter bits in proper relation to the bottom trim chain. The front hydraulic jacks 14 may then be operated to tilt the frame 2 downwardly relative to the base to bring the bottoms of the boring heads 3 and 4 and the lower floor trimming cutter 5 down to the floor level and the separately operable rear hydraulic jacks 15 may be operated, if necessary, to tilt the frame 2 sidewise relative to the base to level up the boring heads and trimming cutters. The hydraulic jacks 154 may then be operated to swing the boom frame 143 upwardly to bring the upper roof trimming cutter 6 to the proper operating level and, if necessary, the screw and nut devices 148 may be adjusted to tilt the frame 138 of the upper cutter about its pivot 146 relative to the boom frame to bring the upper cutter into its proper vertical operating position. By operating the hydraulic jacks 154 the upper cutter may be positioned to operate at different levels and the adjustable limit chains 161 may be adjusted to limit the elevation of the upper cutter to the desired maximum height. With the head end of the apparatus in expanded operating position the motors 39 may then be operated to drive the boring heads 3 and 4 and the lower and upper trimming cutters 5 and 6 and the conveying means 7 may be concurrently driven by the motors 193, and the apparatus may be advanced by the tractor base bodily over the mine floor to feed the boring heads and cutters toward the work to penetrate the latter thereby to effect the mining operation. When the mining apparatus has penetrated the mine vein to the proper depth or if, for any other reason, it is desired to retract the apparatus the head end of the apparatus may be collapsed by operating the hydraulic cylinders 93 and 109 to swing the side guide frames 88 upwardly and to cause the take-up idler 92 to swing downwardly to reduce the lateral limits of the lower trimming cutter and the hydraulic cylinders 57 of the retractable boring arms 27 of the boring heads may be operated to retract the outer boring cutters 28 to reduce the diameters of the boring heads. The hydraulic jacks 154 may also be operated to lower the upper trimming cutter 6 to the full line position shown in FIG. 4, and the front hydraulic jacks 14 may then be operated to tilt the frame 2 upwardly to raise the bottoms of the boring heads and the lower trimming cutter above the floor level. The tractor base may then be operated in the reverse direction to propel the apparatus rearwardly within the mine entry or passageway without interference of the trimming cutters and boring heads with the walls of the entry or passageway.

When the lower trimming chain is in its normal operating position with its bottom run disposed at the floor level, as shown in FIG. 3, the side guide frames 88 of the chain are held downwardly by the hydraulic cylinders 93, as shown. The take-up idler 92 operated by the hydraulic cylinder 109 maintains the lower trimming chain under the proper tension in either its operative or collapsed positions, and the manual adjusting device 115, 115' may be operated to take up any undue slack in the chain.

The adjusting screws 68 of the boring heads may be adjusted to set the outer bit carriers 28 in different predetermined positions radially of the boring heads and the hydraulic cylinders 57 may be operated to move the outer bit carriers 29 outwardly or to retract the outer bit carriers, as desired. When the outer bit carriers are adjusted into different predetermined positions, or if boring heads of different diameters are to be employed, the elevation of the axes of rotation of the boring heads must be varied to bring the bottoms of the boring heads at the proper floor level and this may be accomplished by adjusting the slide 34 in a vertical direction along its guideways relative to the tiltable frame 2. The adjustable slide may be set in different predetermined positions along its upright guideways by means of bolts or screws 37 insertable in properly spaced holes 38. By operating the hydraulic jacks 154 the boom frame 143 may be swung about its pivot to vary the operating height of the upper cutter 6 thereby to vary the height of the mine entry or passageway. The front hydraulic jacks 14 may be operated to tilt the frame 2 to vary the elevation of the entire head end of the apparatus with respect to the floor level.

As the mining apparatus is advanced over the mine floor by the crawler treads of the tractor base during the mining operation and the mineral of the mine vein is dislodged and disintegrated by the revolving boring heads and the upper and lower trimming cutters, the disintegrated mineral is swept by the deflectors 184 of the boring heads inwardly and rearwardly toward the forward receiving portion of the conveying means 7 and the endless conveyor moves the disintegrated mineral received thereby upwardly and rearwardly of the apparatus to a convenient point of delivery remote from the working face. The discharge end of the conveying means 7 may be adjusted laterally by the hydraulic cylinders 192 and may be tilted in vertical planes by the hydraulic jacks 190 to vary the location of the discharge end of the conveying means, in manners well known to those skilled in the art.

As a result of this invention, an improved continuous mining apparatus of the type known as a twin-bore miner is provided for dislodging and disintegrating the mineral of a solid mine vein in an improved and more efficient manner. By the provision of the revolving boring heads and the upper and lower endless loop trimming cutters, a mine entry or passageway may be rapidly formed in a solid mine vein, and by the provision of the vertical adjustability of the upper trimming cutter the height of the mine entry or passageway may be varied. The retractable trimming cutters and boring arms enable collapse of the boring-head structure to reduce its outer limits thereby to facilitate retraction of the mining apparatus within the mine entry or passageway. By the provision of the vertical adjustability of the supporting structure for the boring heads and the adjustable boring arms the diameters of the heads may be varied to suit different operating conditions. The tiltable supporting frame for the boring-head structure enables variation in elevation of the boring heads to raise the bottoms thereof above the floor level and also enables the boring heads to follow an uneven floor. The improved continuous mining apparatus is not only efficient and reliable in operation but is also rugged in design, well adapted to meet the severe conditions of service encountered in a mine. These and other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. A mining apparatus comprising, in combination, a frame, a collapsible disintegrating head mechanism including rotary boring heads journaled on said frame to turn about parallel axes, a lower trimming cutter on said frame rearwardly of said boring heads, and an upper trimming cutter on said frame rearwardly of said boring heads, said lower trimming cutter disposed in a transverse zone intermediate said boring heads and said upper trimming cutter, said cutters when said head mechanism is collapsed disposed in overlapping relation.

2. A mining apparatus as set forth in claim 1 wherein said lower trimming cutter comprises an endless, open-centered-loop cutter chain guided to travel in a vertical orbit in transverse vertical planes and having its bottom run traveling horizontally across the apparatus at the floor level.

3. A mining apparatus as set forth in claim 2 wherein said upper trimming cutter comprises an endless, open-centered-loop cutter chain guided to travel in a vertical orbit in transverse vertical planes rearwardly of said lower trimming cutter.

4. A mining apparatus as set forth in claim 3 wherein the upper trimming cutter chain is mounted for adjustment into different elevated positions and arranged on said frame vertically to overlap said lower trimming cutter chain rearwardly of the latter when said upper cutter chain is in lowered position on said frame below the level of the tops of said boring heads.

5. In a mining apparatus having rotary boring heads for forming overlapping bores in a mine vein, the combination comprising a frame, a roof trimming cutter for trimming the mine roof between the bores formed by the boring heads, said trimming cutter comprising an endless, open-centered loop cutter chain having a horizontal top run at the roof level and guided for circulation in a transverse vertical orbit, a boom frame pivotally mounted on said frame to swing in vertical planes relative thereto about a transverse pivotal axis, a support by which said trimming cutter is carried and pivotally mounted on the outer portion of said boom frame to tilt about an axis parallel to said pivotal axis, said tiltable support at its forward portion providing a guideway along which said cutter chain is guided for orbital movement, said support having an elongated opening surrounded by said guideway and a communicating chamber for receiving the mineral cut by said cutter chain and deflector means within said support at the top of said chamber for applying a downward dislodging pressure to the mineral within said chamber to dislodge the mineral as the cutter is advanced toward the work, and an adjusting device between said boom frame and said support for tilting the latter about its pivot to locate said trimming cutter in vertical planes for horizontal cutting irrespective of the angular position of said boom frame about its pivot.

6. In a mining apparatus, a collapsible cutting and disintegrating head mechanism for dislodging mineral from a solid mine vein comprising a pair of cooperating rotary cutters for forming parallel overlapping horizontal bores in the vein, a top cutter for trimming the roof, a bottom cutting means for trimming the floor, means for lowering said top cutter, and means for effecting a decrease in the lateral extent of said bottom cutting means, said top cutter and said bottom cutting means being movable as aforesaid to decrease the limits of the outer boundaries of said head mechanism, said rotary cutters projecting forwardly in advance of said bottom cutting means and the latter being disposed in a transverse zone between said rotary cutters and said top cutter, said top cutter and said bottom cutting means when said head mechanism is collapsed disposed in overlapping relation.

7. In a mining apparatus, a base movable over the floor of a mine, cooperating rotary boring heads mounted on said base for forming parallel horizontal overlapping bores of circular cross section in the mineral of a solid mine vein, trimming cutting means including an upper horizontal trimming cutter operating at the roof level for cutting away the triangular point left at the roof between the overlapping bores, said upper trimming cutter provided by the horizontal top run of an orbitally movable endless loop cutter chain having an open center for receiving a core of mineral cut by said chain, rotary guides for said chain at the opposite sides of said upper cutter and an adjustable frame on which said guides are journaled with their axes disposed in fixed spaced relation, said top run of said loop cutter extending tangentially to the tops of the peripheral orbits of said boring heads, means for mounting said upper cutter for adjustment into different elevated positions relative to said boring heads including an uppermost position a substantial distance above said tangential position to provide a cut in the roof above the overlapping bores and a lowered position a substantial distance below said tangential position to collapse said trimming cutter within the projections of the circular orbits of said boring heads, means for driving said boring heads, means for adjusting said upper trimming cutter on said mounting means, and means for feeding said boring heads and said trimming cutter toward the work during the boring and trimming operation, said adjustable frame for said upper trimming cutter providing a marginal guideway for said loop cutter chain, said guideway having downwardly curved end portions for directing the chain toward one guide and for receiving the same from the other, said curved portions when said upper trimming cutter is in lowered position lying within the projections of the circular orbits of said boring heads.

8. A mining apparatus as set forth in claim 7 wherein said adjustable frame of said upper trimming cutter has extending from the top frame-wall downwardly within the upper portion of its open center core breaker means for applying a downward pressure to the top of the core to break off fragments of the core as the apparatus is advanced, said adjustable frame having an open bottom through which the core fragments may pass.

9. In a mining apparatus, the combination comprising a base, a collapsible mine vein disintegrating head mechanism carried by said base and embodying a frame carrying a lower collapsible disintegrating head portion extending transversely the full width of said base and collapsible to reduce its outer dimensions, and a second frame tiltably mounted on said first frame and carrying a cooperating upper disintegrating head portion adjustable in vertical planes relative to said lower head portion, said upper disintegrating head portion comprising a guide frame providing a guideway and an endless face type, loop chain cutter guided for orbital circulation along said frame guideway and having parallel superimposed runs traveling in relatively opposite directions, said loop chain cutter having cutting elements projecting from its forward side whereby when said upper head portion is moved up and down the mineral acted on by said cutting elements is dislodged and disintegrated at different levels, said lower and upper head portions cooperating to form an opening in a solid mine vein of such dimensions as to receive said base as the apparatus is advanced, motor operated mechanism carried by said base for driving said upper and lower disintegrating head portions, and power operated means for varying the elevation of said upper head portion relative to said lower head portion thereby to vary the height of the roof level of said opening, said power operated means operable to adjust said upper head portion into a lowered collapsed position to bring said superimposed runs of said loop chain cutter entirely within the projected peripheral boundaries of said lower head portion when the latter is collapsed.

10. In a mining apparatus, a collapsible mine vein disintegrating head mechanism for disintegrating the mineral of a solid mine vein and comprising a relatively wide lower head portion for disintegrating the mineral at the lower portion of a mine vein, said lower head portion comprising coacting collapsible rotary boring instruments mounted to revolve on parallel longitudinal axes to form parallel overlapping bores in the mine vein and collapsible to reduce their effective diameters, said head mechanism also including a cooperating, relatively adjustable upper disintegrating head portion extending in horizontal planes transversely of the upper portions of the outer periphery of the orbits of the boring instruments substantially coextensive with said lower head portion and tiltable up and down relative to said lower head portion for dislodging and disintegrating a transverse section of mineral at the upper portion of the mine vein, the axis of tilt of said upper head portion being located a substantial distance rearwardly of said lower head portion so that said upper head portion swings through a wide arc as said upper head portion is tilted, said upper and lower head portions operating concurrently to form a cut of substantial width extending the full height of the mine vein between the floor and the roof, motor operated mechanism for tilting said head mechanism up and down about its pivotal axis relative to said lower head portion to locate said upper head portion in different elevated positions to vary the height of the cut, and operable to adjust said upper head portion into a lowered collapsed position wherein it lies entirely within the projected peripheral boundaries of said lower head portion when the latter is collapsed, and means for concurrently advancing said upper and lower head portions into the mineral of the mine vein.

11. In a mining apparatus, the combination comprising coacting collapsible rotary boring instruments arranged in overlapping relation on parallel longitudinal axes for forming parallel overlapping portions in a solid mine vein between the roof and floor and collapsible to reduce their outer dimensions, orbitally moving cutting means having a horizontal portion extending substantially in parallelism with a horizontal line tangential to the tops of the circular orbits of said rotary boring instruments and a parallel portion at a higher elevation, said parallel portions cooperating to remove a transverse section of mineral from the mine vein to provide an elongated recess in the mine vein near the roof level in planes above said overlapping bores with said recess in communication with the latter, and means for adjusting said cutter means in upright planes relative to said boring instruments to vary the height of the section of mineral removed thereby, said adjusting means being operable to adjust said cutter means into a lowered collapsed position wherein said parallel horizontal portions thereof both lie entirely within the projected peripheral orbit of said boring instruments when the latter are collapsed.

12. A mining apparatus as set forth in claim 11 wherein said cutter means is in the form of an endless loop cutter chain and said cooperating parallel portions of said cutting means are constituted by the bottom and top runs of said cutter chains, said loop cutter chain when said cutter means is in said lowered collapsed position being disposed entirely below a horizontal plane in which said horizontal tangential line lies.

13. A mining apparatus comprising, in combination, a collapsible mine vein disintegrating head mechanism for cutting out an opening in a solid mine vein between the floor and roof and comprising a lower disintegrating head portion and a cooperating relatively adjustable upper disintegrating head portion, said lower head portion being collapsible to reduce its outer dimensions, said upper head portion extending transversely of said lower head portion and said portions operable when advanced to remove superimposed sections of mineral from the mine vein, and means for mounting said upper head portion for tilting adjustment up and down relative to said lower head portion to vary the height of the transverse section of the mineral removed by said upper head portion thereby to vary the height of the opening in the mine vein, said upper head portion when in raised position having its bottom disposed in proximity to a horizontal plane lying at the top of said lower head portion when the latter is expanded, said upper head portion when in lowered position having its upper portion disposed rearwardly of and overlapping with said lower head portion when the latter is collapsed with the top of said upper head portion disposed entirely below said horizontal plane, said lower head portion when collapsed having a transverse space located rearwardly thereof for receiving said upper head portion when the latter is in said lowered position.

14. In a mining machine, a supporting frame, rotary boring cutters journaled on said frame to turn about parallel axes extending longitudinally of the machine, an upper endless loop cutter disposed rearwardly of said boring cutters and having an open centered frame for receiving a core of mineral cut by said loop cutter, an arm structure pivotally mounted on said frame to swing in a vertical direction relative thereto about a transverse axis for varying the elevation of said loop cutter frame with respect to said boring cutters, means for pivotally mounting said loop cutter frame to tilt relative thereto about an axis parallel to said pivotal axis of said arm structure, means for swinging said arm structure about its pivot, and means for tilting said loop cutter frame about its pivot relative to said arm structure, there being a space rearwardly of said boring cutters into which said loop cutter enters when in its lowered position on said supporting frame.

15. A mining machine as set forth in claim 14 wherein said open centered frame for said loop cutter has core breaker means extending downwardly from the top wall thereof for breaking off fragments of the mineral core as cutting progresses, said open centered frame having an open bottom through which the core fragments may pass.

16. In a mining apparatus having rotary boring heads for forming overlapping bores in a mine vein, the combination comprising a frame, a roof trimming cutter for trimming the mine roof between the bores formed by the boring heads, a boom frame pivotally mounted on said frame to swing in vertical planes relative thereto about a transverse pivotal axis, a support by which said trimming cutter is carried and pivotally mounted on the outer portion of said boom frame to tilt about an axis parallel to said pivotal axis, and an adjusting device between said boom frame and said support for tilting the latter about its pivot in vertical planes relative to said boring heads to locate said trimming cutter in vertical planes for horizontal cutting irrespective of the angular position of said boom frame about its pivot, said trimming cutter comprising an endless, open-centered loop cutter chain having a horizontal top run at the roof level and guided for circulation in a transverse vertical orbit, and said tiltable support at its forward portion providing a guideway along which said cutter chain is guided for orbital movement, the pivot of said tiltable support being located rearwardly of said guideway in horizontal planes a substantial distance below the guideway portion for the top run of said cutter chain.

17. In a mining machine, a base, a frame carried by said base, rotary boring cutters journaled on the forward portion of said frame in advance of said base, an upper roof cutter, means for adjustably supporting said roof cutter for movement in a vertical plane relative to said frame to vary its elevation relative to said boring cutters including horizontal positions above and below the tops of the boring cutter orbits, motor operated means on said frame for driving said boring cutters, and separate self adjusting motor operated means distinct from said first motor operated means and also mounted on said frame for driving said roof cutter in all adjusted positions of the latter.

18. A mining machine as set forth in claim 17 wherein a vertically adjustable support for said boring cutters is mounted on said frame, a floor cutter, and motor driven means for driving said floor cutter including a driving element carried by said vertically adjustable support.

References Cited in the file of this patent

UNITED STATES PATENTS

| | | |
|---|---|---|
| 812,899 | Thacher | Feb. 20, 1906 |
| 1,653,111 | Lobbey | Dec. 20, 1927 |
| 1,726,963 | McKinlay | Sept. 3, 1929 |
| 2,281,503 | Levin | Apr. 28, 1942 |
| 2,461,877 | Brereton | Feb. 15, 1949 |
| 2,684,641 | Warf | July 27, 1954 |
| 2,705,624 | Robbins | Apr. 5, 1955 |
| 2,707,626 | Cartlidge | May 3, 1955 |
| 2,711,889 | Robbins | June 28, 1955 |
| 2,711,890 | Robbins et al. | June 28, 1955 |
| 2,711,891 | Robbins et al. | June 28, 1955 |
| 2,715,527 | Cartlidge et al. | Aug. 16, 1955 |
| 2,734,731 | Cartlidge et al. | Feb. 14, 1956 |
| 7,743,093 | Robbins | Apr. 24, 1956 |
| 2,745,649 | Robbins | May 15, 1956 |
| 2,753,169 | Joy | July 3, 1956 |
| 2,777,681 | Ball | Jan. 15, 1957 |
| 2,783,037 | Cartlidge | Feb. 26, 1957 |
| 2,836,407 | Tracy | May 27, 1958 |
| 2,868,526 | Jamison et al. | Jan. 23, 1959 |
| 2,877,999 | Snyder et al. | Mar. 17, 1959 |

FOREIGN PATENTS

| | | |
|---|---|---|
| 668,322 | Great Britain | Mar. 12, 1952 |